United States Patent
Kadomatsu

(10) Patent No.: US 10,230,858 B2
(45) Date of Patent: Mar. 12, 2019

(54) IMAGE READING APPARATUS AND IMAGE READING METHOD

(71) Applicant: CANON KABUSHIKI KAISHA, Tokyo (JP)

(72) Inventor: Daiki Kadomatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/656,886

(22) Filed: Jul. 21, 2017

(65) Prior Publication Data

US 2018/0034990 A1 Feb. 1, 2018

(30) Foreign Application Priority Data

Aug. 1, 2016 (JP) .................................. 2016-151329

(51) Int. Cl.
H04N 1/00 (2006.01)
(52) U.S. Cl.
CPC ..... H04N 1/00689 (2013.01); H04N 1/00687 (2013.01); H04N 1/00737 (2013.01); H04N 1/00771 (2013.01); H04N 1/00777 (2013.01); H04N 1/00692 (2013.01); H04N 1/00694 (2013.01); H04N 1/00729 (2013.01); H04N 1/00734 (2013.01); H04N 2201/0094 (2013.01)

(58) Field of Classification Search
CPC ........... H04N 1/00681; H04N 1/00771; H04N 1/00687; H04N 1/00737; H04N 1/00753; H04N 1/00795; H04N 1/00814; H04N 1/00824; H04N 1/00689; H04N 1/00692; H04N 1/00705; H04N 1/00761; H04N 1/1017; H04N 1/193; G03G 15/607

USPC ............... 358/474, 496, 497, 498, 475, 488; 355/76; 399/371

See application file for complete search history.

(56) References Cited

U.S. PATENT DOCUMENTS

| | | | |
|---|---|---|---|
| 4,229,101 A | 10/1980 | Hamlin | |
| 4,914,525 A * | 4/1990 | Abe .................... | H04N 1/00519 292/109 |
| 6,646,768 B1 * | 11/2003 | Andersen ............. | G03G 15/607 358/474 |
| 7,672,023 B2 * | 3/2010 | Tse ........................ | G03G 15/607 358/474 |
| 2006/0171726 A1 | 8/2006 | Noda | |
| 2007/0134037 A1 * | 6/2007 | Tse ........................ | G03G 15/607 399/371 |
| 2012/0081762 A1 * | 4/2012 | Yamada ............. | H04N 1/00408 358/474 |

(Continued)

FOREIGN PATENT DOCUMENTS

| | | |
|---|---|---|
| EP | 2169933 A1 | 3/2010 |
| JP | H03-100564 A | 4/1991 |

(Continued)

*Primary Examiner* — Negussie Worku
(74) *Attorney, Agent, or Firm* — Canon USA Inc., IP Division

(57) ABSTRACT

An image reading apparatus and an image reading method is provided. The apparatus and method are capable of efficiently performing a check process for determining whether a document has been forgotten after image reading only in an appropriate case. Whether a process for detecting a forgotten document is necessary to be performed is determined prior to the process every time after a reading process for reading an image of a single page.

18 Claims, 16 Drawing Sheets

(56) References Cited

U.S. PATENT DOCUMENTS

| | | | |
|---|---|---|---|
| 2012/0224203 A1* | 9/2012 | Masuda | H04N 1/00697 358/1.13 |
| 2013/0057920 A1* | 3/2013 | Nagata | H04N 1/00411 358/1.16 |
| 2014/0233074 A1 | 8/2014 | Itoh | |

FOREIGN PATENT DOCUMENTS

| | | |
|---|---|---|
| JP | H04-345277 A | 12/1992 |
| JP | 2015-026979 A | 2/2015 |

* cited by examiner

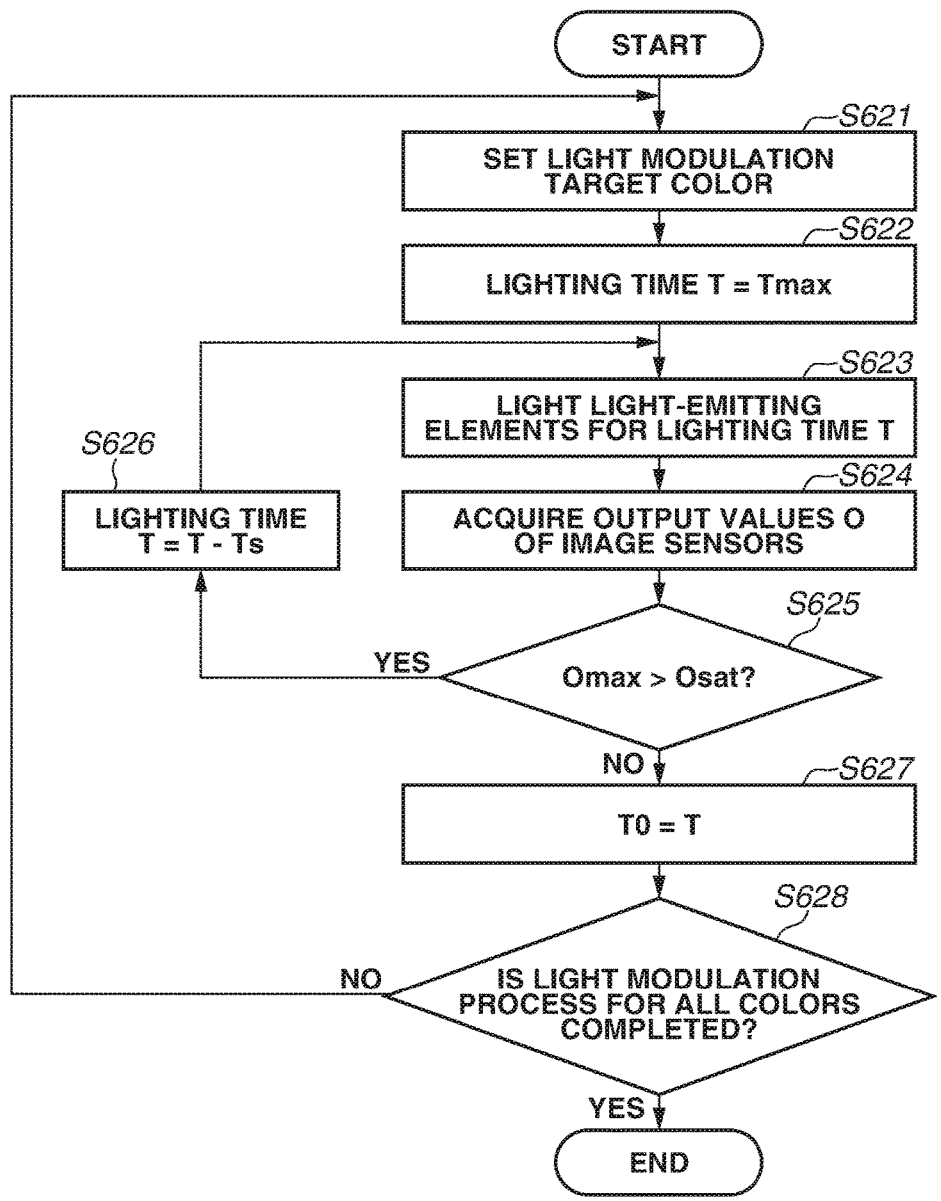

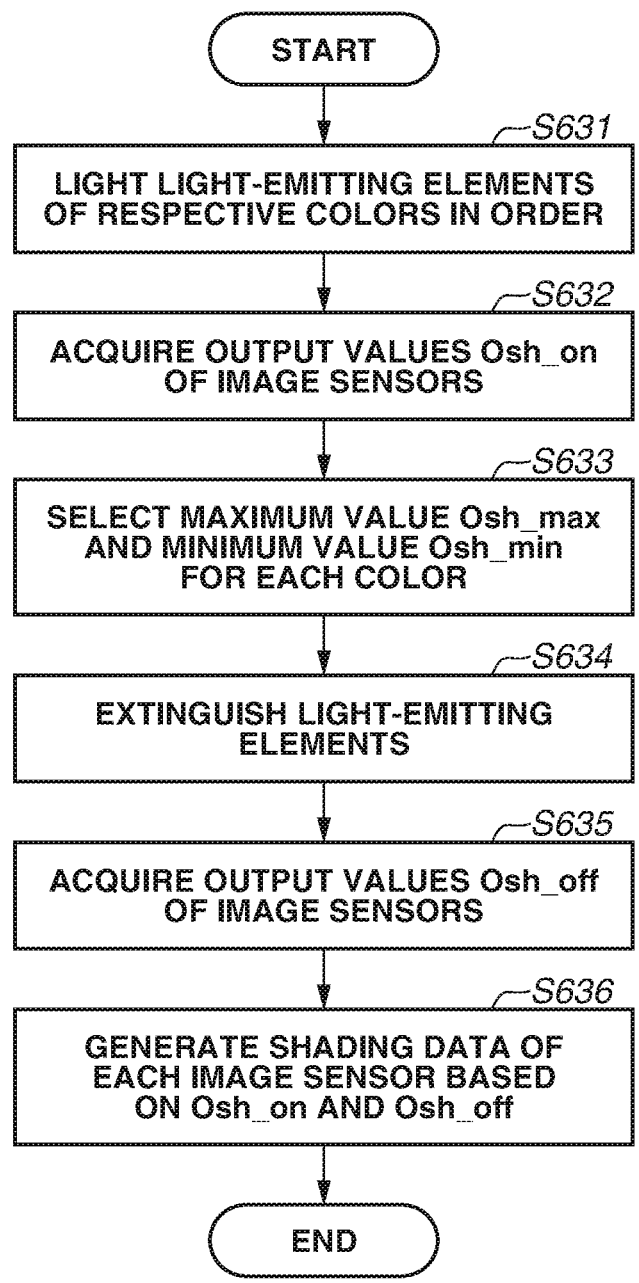

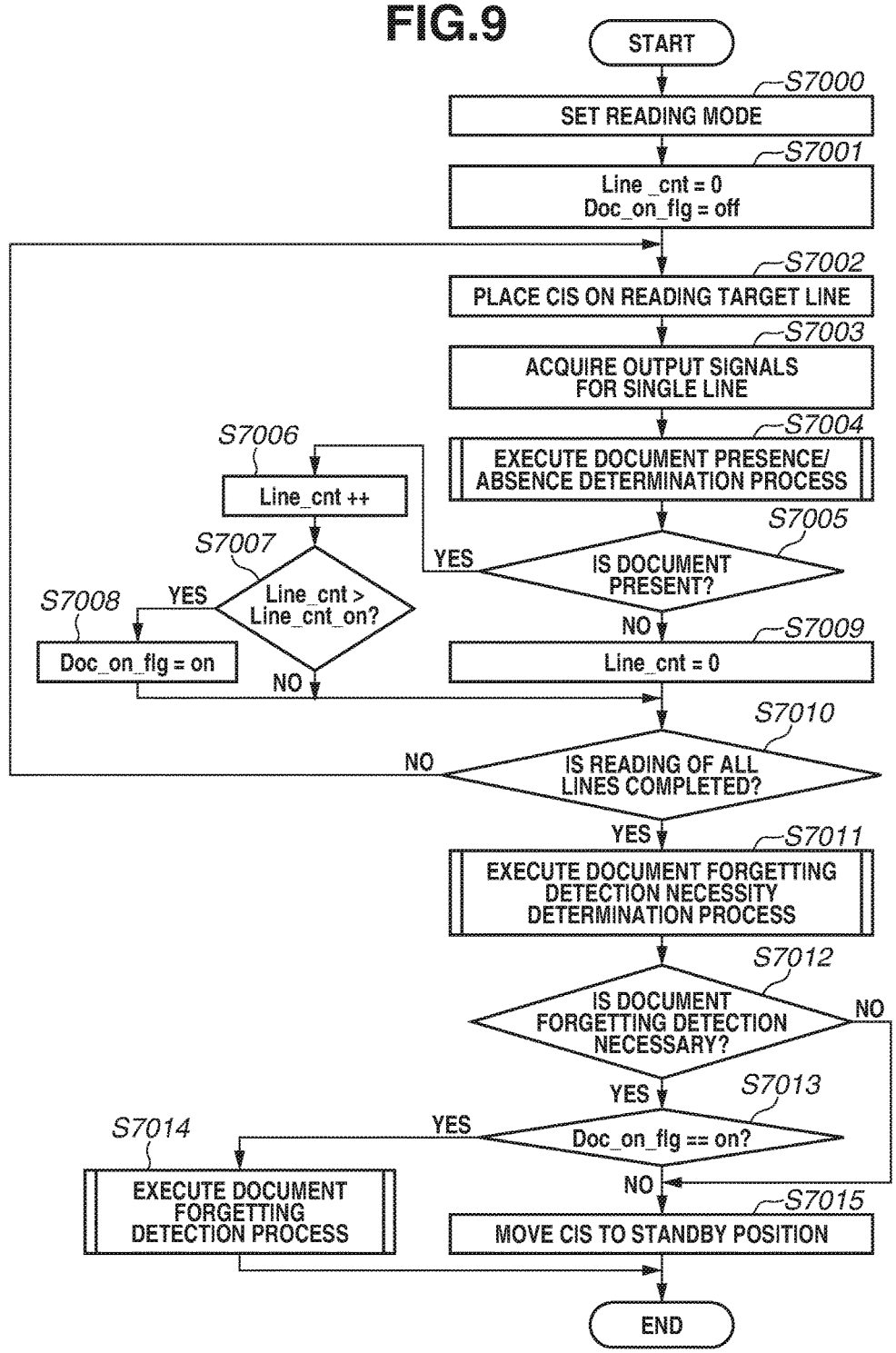

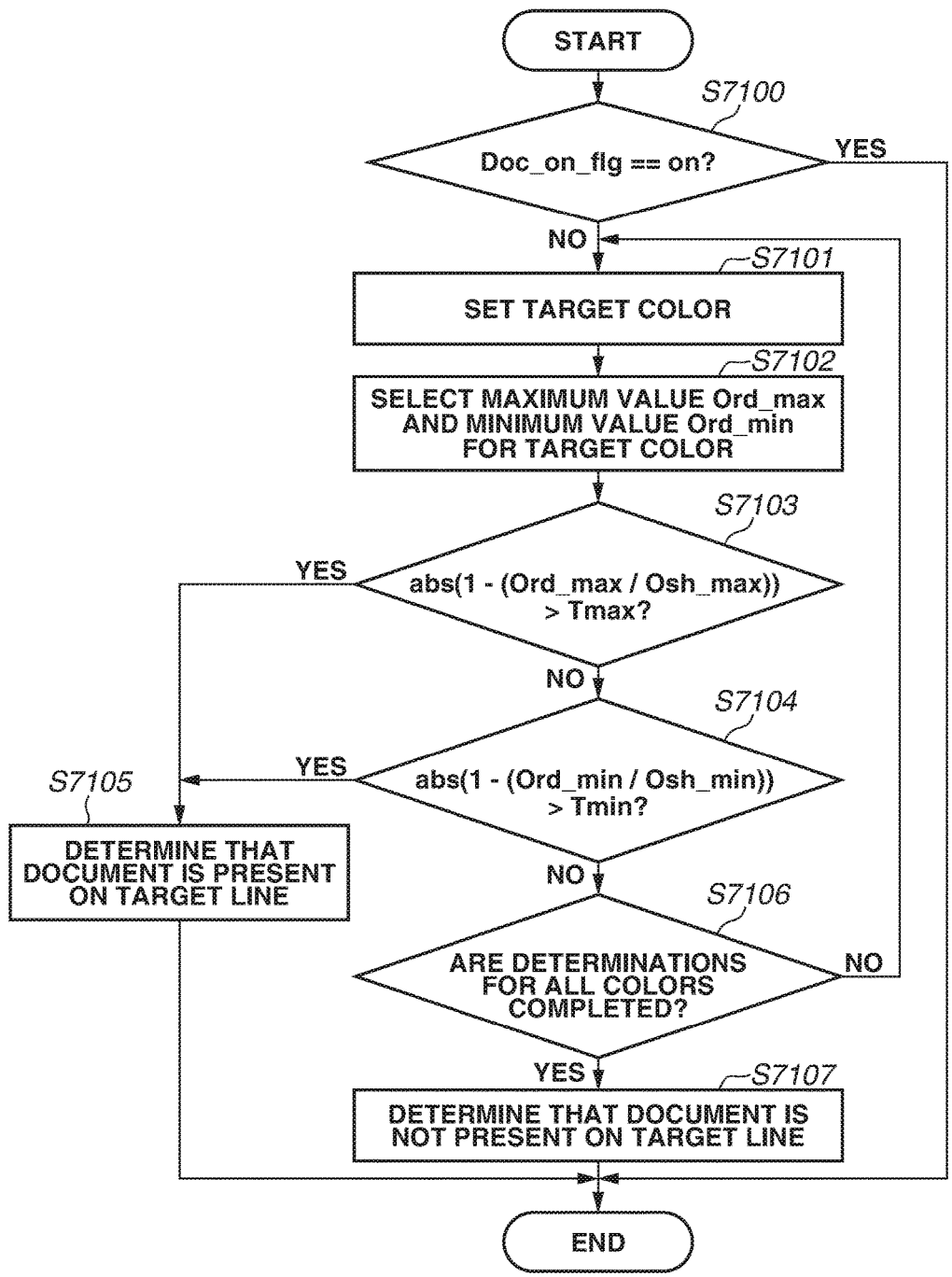

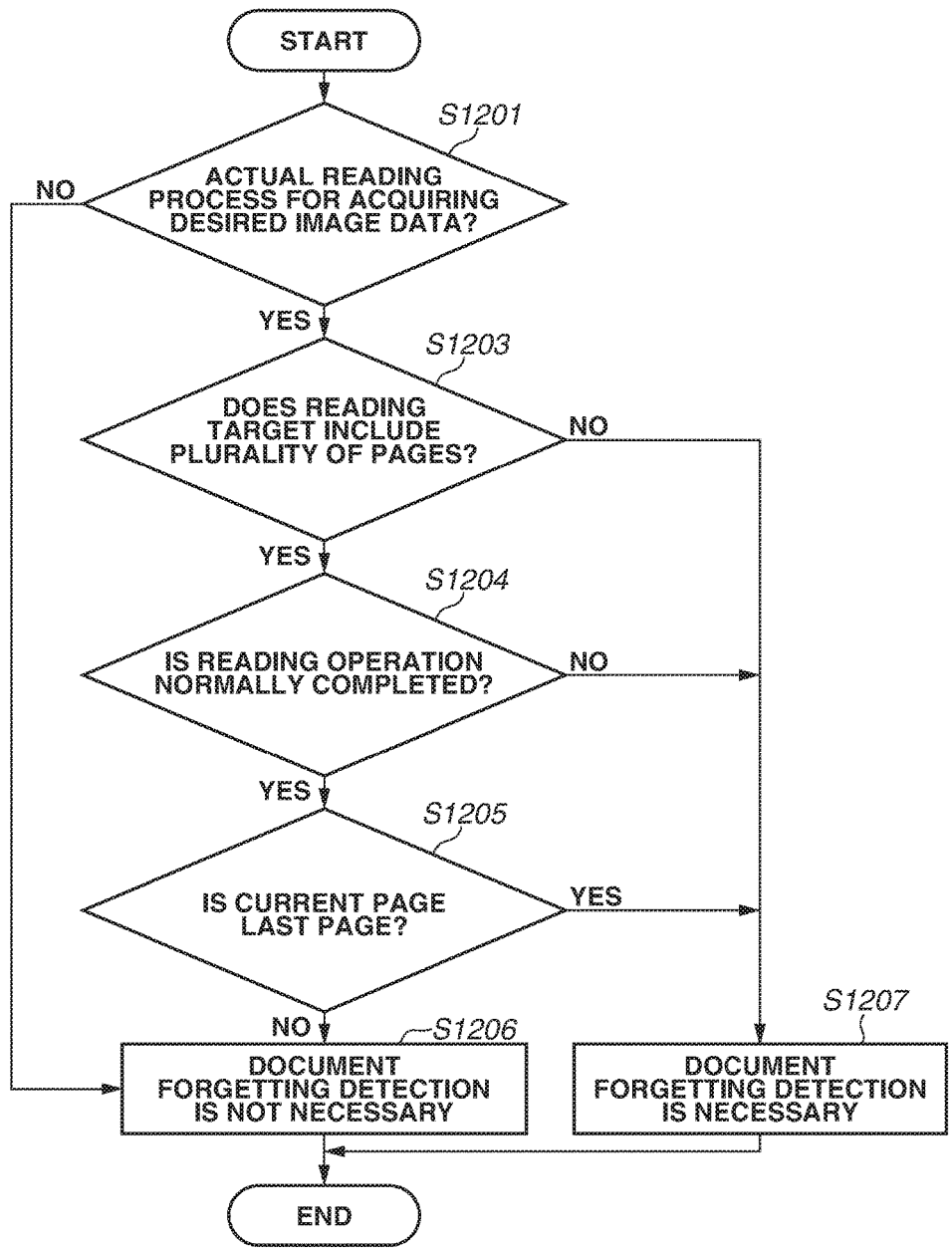

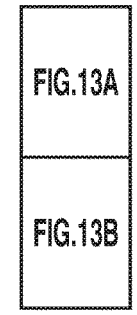
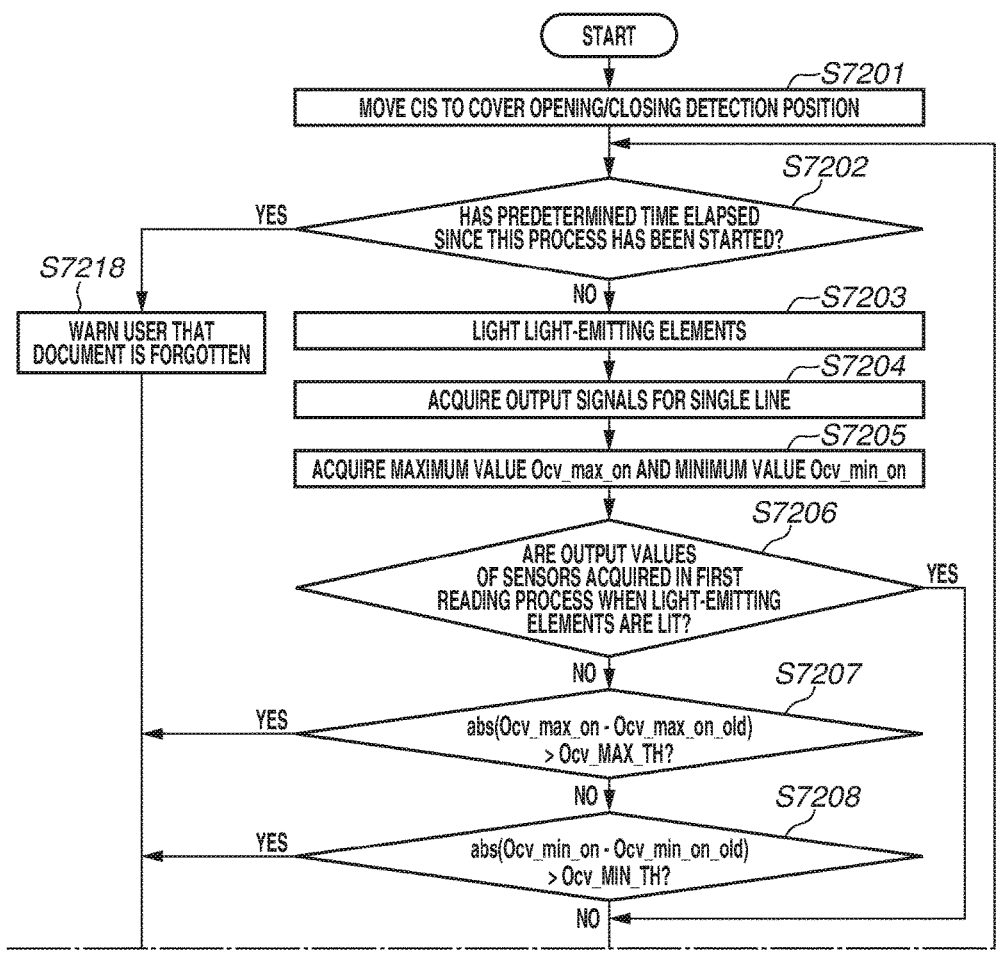

IMAGE READING APPARATUS AND IMAGE READING METHOD

BACKGROUND OF THE INVENTION

Field of the Invention

The present invention relates to an image reading apparatus for reading a document.

Description of the Related Art

In an image reading apparatus capable of reading a document set on a document platen, a document after a reading process is sometimes left behind by a user. Thus, for example, Japanese Patent Application Laid-Open No. 2015-026979 discusses an image reading apparatus that performs a process of checking whether a document is left on a reading platen after a reading process is completed.

However, performing such a check process discussed in Japanese Patent Application Laid-Open No. 2015-026979 every time after a reading process for reading a document may raise the following issues: the processing time takes longer than necessary, and an unnecessary warning is given to a user. For example, in a case where two-sided copying is performed on a single sheet by setting documents page by page on the reading platen, the user needs to change and set a document on the reading platen again from a document for the first side to a document for the second side. In this case, when a reading process for reading the document for the first side ends, the user has not yet been obtained a desired resulting product. Thus, the possibility that the user forgets to remove the document for the first side from the reading platen is low. If the check process is automatically performed even in such a case, the user is troubled by the processing time longer than necessary and an unnecessary warning.

SUMMARY OF THE INVENTION

Present embodiments are directed to further usability improvements to a process to ensure that a document is not forgotten after an image is read. According to an embodiment, an image reading apparatus includes a reading unit configured to read an image of a document set on a document platen, a document forgetting detection unit configured to execute a detection process for detecting forgetting of the document on the document platen, and a control unit configured to, in a case where a function of reading a document including a plurality of pages is set, perform control to cause the detection process not to be executed on at least a page other than a last page of the document and to be executed on the last page of the document.

Further features and embodiments will become apparent from the following description of exemplary embodiments with reference to the attached drawings.

BRIEF DESCRIPTION OF THE DRAWINGS

FIG. 7 is a flowchart illustrating details of a light modulation process.

FIG. 8 is a flowchart illustrating details of a shading data creation process.

FIG. 9 is a flowchart illustrating a document reading process.

FIG. 10 is a flowchart illustrating a document presence/absence determination process.

FIG. 12 is a flowchart illustrating a document forgetting detection necessity determination process.

FIG. 13 is a flowchart illustrating a document forgetting detection process.

DESCRIPTION OF THE EMBODIMENTS

Figure 1A:
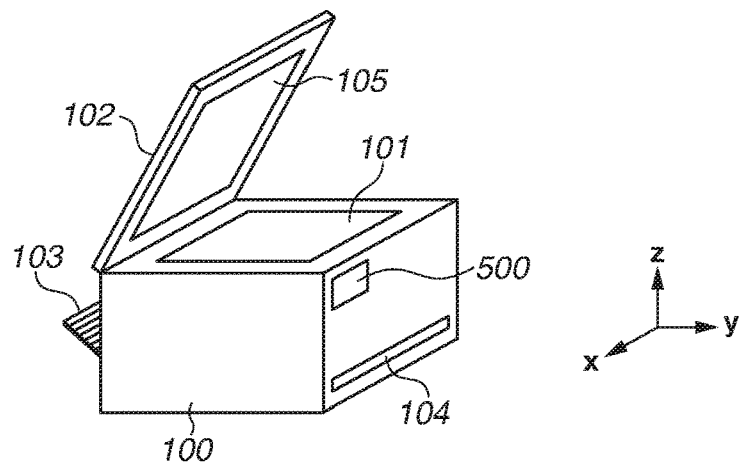
FIGS. 1A to 1C are schematic diagrams illustrating a configuration of a multi-function printer (MFP).
Figure 1B:
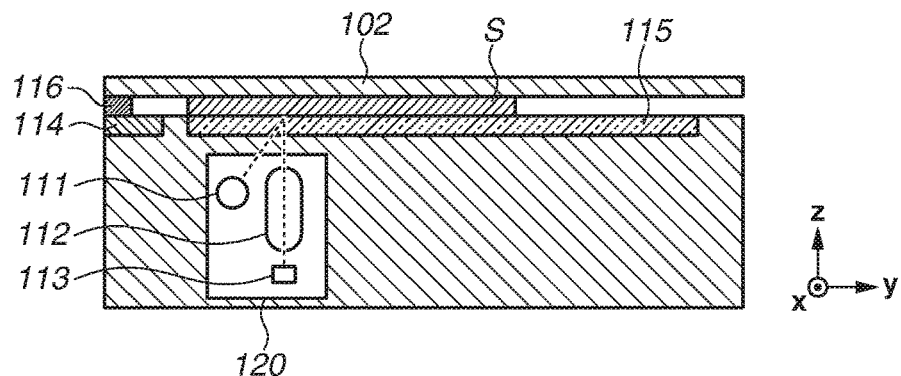
Figure 1C:
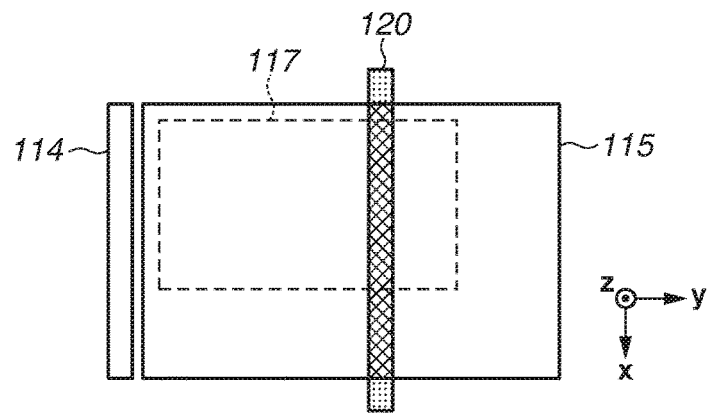

FIGS. 1A to 1C are schematic diagrams illustrating a configuration of a multi-function printer (hereinafter, "MFP") 100, which can be used as an image reading apparatus. FIG. 1A is an external perspective view of the MFP 100. FIG. 1B is a side cross-sectional view of the MFP 100. FIG. 1C is a top view of the MFP 100 in the state where a document platen cover is detached. When a reading process for reading a document is performed, a user opens a document platen cover 102, which can be opened and closed about a hinge 116, as illustrated in FIG. 1A. Then, the user sets a document S on a document platen 101. In this process, the user places the document S on the document platen 101 such that the surface of the document S to be read is opposed to contact glass 115. After that, the user closes the document platen cover 102. The document platen cover 102 functions also as a pressure plate for holding down the document S set on the contact glass 115. To the surface of the document platen cover 102 that comes into contact with the contact glass 115, a white sheet 105 is attached to make a read image of a portion where the document S is not present less distinct from a read image of a document area. On the front surface of the MFP 100, an operation unit 500 is provided, to which the user inputs a command.

Figure 2:
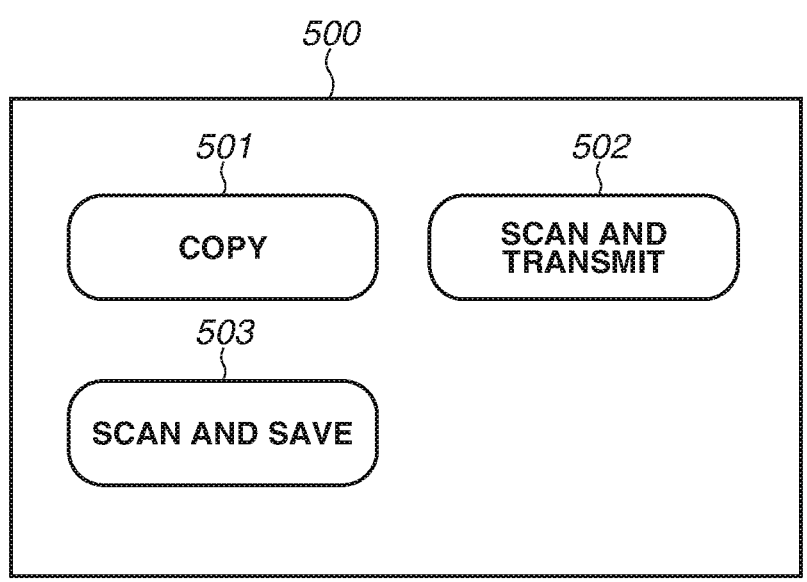
FIG. 2 is a diagram illustrating an example of layout of operation keys included in an operation unit.

FIG. 2 is a diagram illustrating the layout of operation keys in the operation unit 500. When the user specifies a "copy" key 501, a reading operation for reading the document S set on the document platen 101 is performed, and image data corresponding to the document S is acquired. The acquired image data is recorded on a blank sheet inserted through an insertion opening 103, and the sheet on which the image data has been recorded is discharged through a discharge opening 104. When the user specifies a "scan and transmit" key 502, the image data acquired by the reading operation is transmitted to a specified external apparatus via a network. When the user specifies a "scan and save" key 503, the image data acquired by the reading operation is directly stored in a memory in the apparatus. Although FIG. 2 illustrates an example where three types of operation keys are provided, a key other than these keys may also be provided. Further, commands as described above to the MFP 100 can also be input from a host computer 300, which is externally connected to the MFP 100.

Within the MFP 100, a scanner mechanism for reading a document and a printer mechanism for recording an image are included. FIG. 1B, however, illustrates only the outline of the scanner mechanism. The contact glass 115, which is fit to the document platen 101, functions to smooth the surface of the document S and also to maintain a constant distance between a scanner sensor (hereinafter, "CIS") 120 and the document S.

The CIS 120 includes a light-emitting element array 111, a rod lens array 112, and an image sensor array 113 and can move in a y-direction in FIG. 1B by a motor (not illustrated). That is, the y-direction corresponds to a sub-scanning direction. In the light-emitting element array 111, a plurality of light-emitting elements are arranged in an x-direction at a density corresponding to a reading resolution (300 dpi). In the rod lens array 112, a plurality of rod lenses are arranged in the x-direction at the density corresponding to the reading resolution (300 dpi). In the image sensor array 113, a plurality of image sensors are arranged in the x-direction at the density corresponding to the reading resolution (300 dpi). That is, the x-direction corresponds to a main scanning direction. The light-emitting element array 111 includes red (R), green (G), and blue (B) light-emitting elements and emits light toward the document S in a cycle synchronized with the moving speed of the CIS 120. Each rod lens collects light emitted from the light-emitting elements and reflected from the document S and guides the collected light to the corresponding one of the image sensors. Each image sensor photoelectrically converts the collected light and transfers an output current to a control unit in the apparatus.

As illustrated in FIG. 1C, the width in the x-direction of the CIS 120 and the moving distance in the y-direction of the CIS 120 are sufficiently greater than the size of the contact glass 115, to ensure reading of the entire surface of the document S placed on the contact glass 115 by the CIS 120. At a position furthest upstream in the y-direction in the range where the CIS 120 can move, a white reference sheet 114 is provided, which is used to perform a shading process for the CIS 120. In an actual reading process, a scanning area 117, which is narrower than the entire area of the contact glass 115, is set according to the document size. The moving distance of the CIS 120 and the number of pixels to be read by the CIS 120 are thus minimized.

Figure 3:
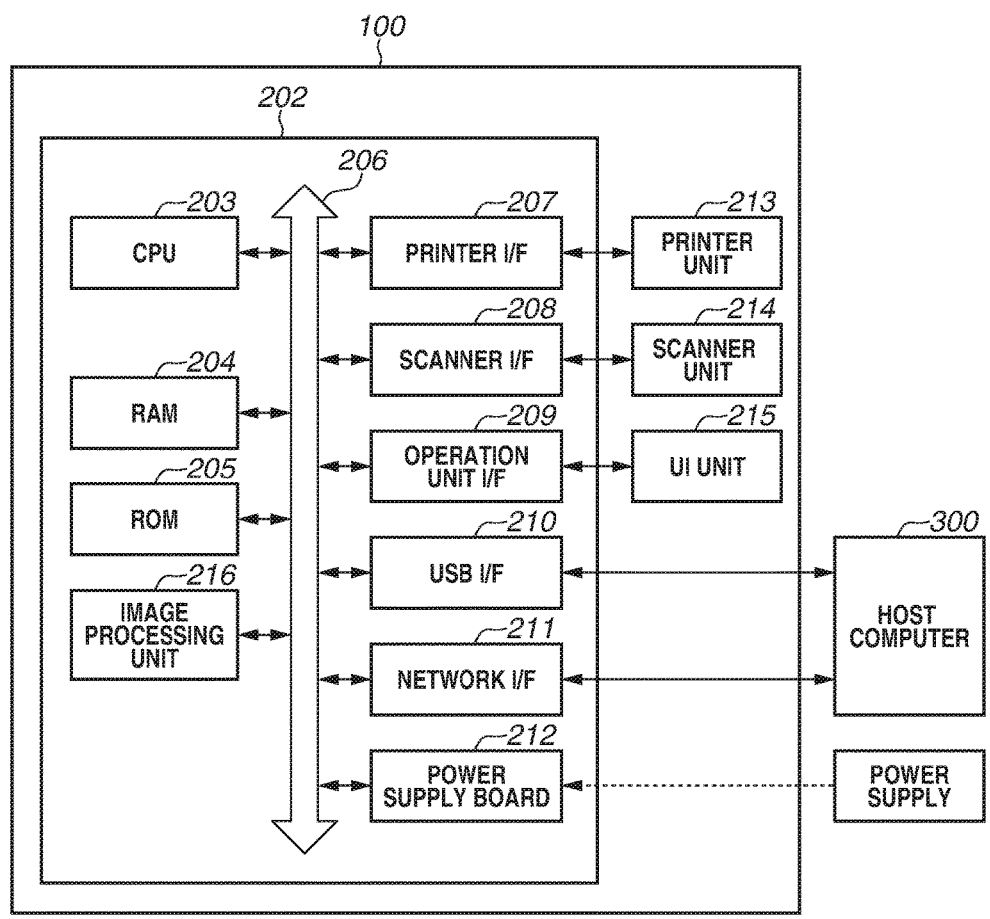
FIG. 3 is a block diagram illustrating a control configuration of the MFP.

FIG. 3 is a block diagram illustrating the control configuration of the MFP 100. A control unit 202 includes mechanisms for controlling a printer unit 213, which executes a recording operation, a scanner unit 214, which executes a reading operation, and a user interface unit (hereinafter, "UI unit") 215, such as the operation unit 500 and a display screen.

A central processing unit (CPU) 203 controls the mechanisms in the apparatus according to a control program and various pieces of setting information stored in a read-only memory (ROM) 205. A random-access memory (RAM) 204 is a main storage memory of the CPU 203 and is used as a work area or used as an area for temporarily holding the storage content of the ROM 205. As the ROM 205 in the present exemplary embodiment, flash storage can be used. However, an auxiliary storage device, such as a hard disk, may also be provided.

A printer interface (I/F) 207 controls the printer unit 213 according to an instruction from the CPU 203. Image data processed by an image processing unit 216 and stored in the RAM 204 is transferred to the printer unit 213 via the printer I/F 207. The printer unit 213 records an image according to the image data.

A scanner I/F 208 controls the scanner unit 214 according to an instruction from the CPU 203. Image data read by the scanner unit 214 is transferred to the control unit 202 via the scanner I/F 208.

An operation unit I/F 209 controls the UI unit 215 according to an instruction from the CPU 203. For example, the operation unit I/F 209 transfers to the CPU 203 a command input by the user through the operation unit 500 of the UI unit 215, and displays the state of the printer unit 213 or the scanner unit 214 on a display unit of the UI unit 215. A Universal Serial Bus (USB) I/F 210 and a network I/F 211 control communication between the host computer 300, which is externally connected to the MFP 100, and the control unit 202.

The image processing unit 216 converts image data acquired by the scanner unit 214 into image data that can be recorded by the printer unit 213, or into image data that can be transferred to the host computer 300. Particularly, the image processing unit 216 is used as a hardware function for performing heavily loaded processing at high speed, for example, in a case where image processing is performed on the acquired image data on the RAM 204 according to the control program stored in the ROM 205.

FIG. 3 illustrates the form in which a single CPU 203 controls the entirety of the apparatus using a single memory (the RAM 204). Alternatively, for example, a plurality of CPUs causes a plurality of memories, such as a RAM, a ROM, and storage, to cooperate to control the entirety of the apparatus. Yet alternatively, more dedicated hardware components, such as the image processing unit 216, may be provided.

Figure 4:
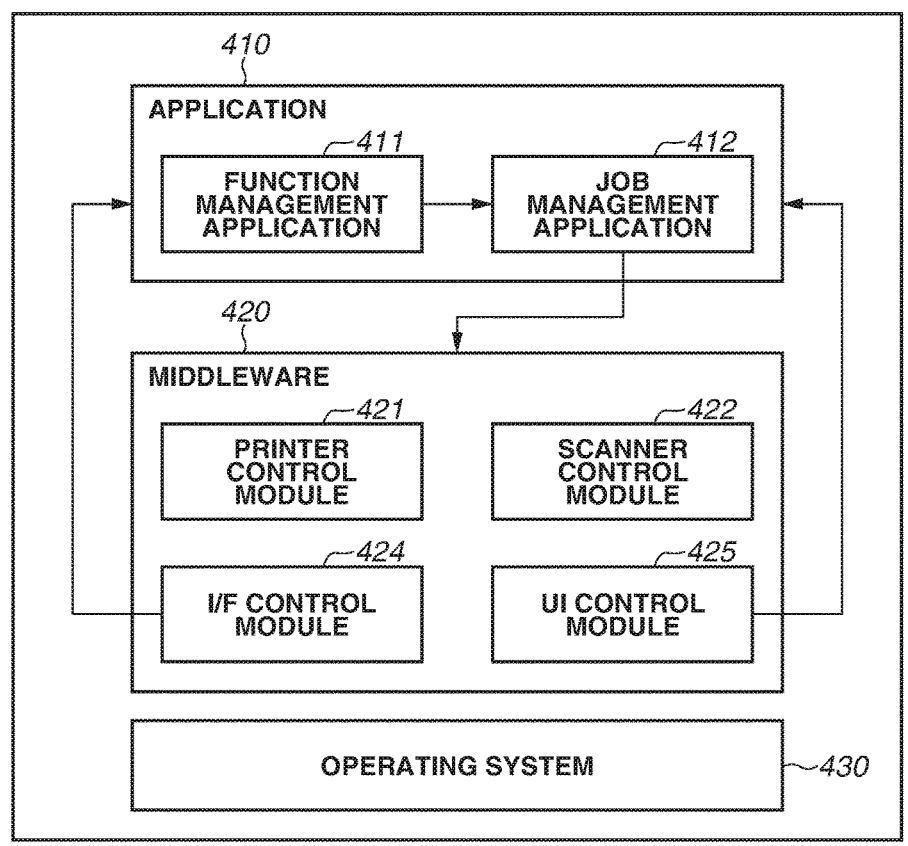
FIG. 4 is a block diagram illustrating a software control configuration of the MFP.

FIG. 4 is a block diagram illustrating the software control configuration of the MFP 100. The control program for the MFP 100 can be broadly divided into an application 410, middleware 420, and an operating system 430. The operating system 430 provides a basic function for executing the control program in the control unit 202. The application 410 causes devices to operate via respective modules included in the middleware 420, to implement functions, such as a copy function, that the MFP 100 provides for the user. Processes implemented by pieces of software are enabled by the CPU 203 in a manner such that the CPU 203 loads various programs corresponding to the pieces of software stored in a memory, such as the ROM 205, into the RAM 204 and executes the various programs.

The middleware 420 includes software modules for controlling the interfaces with the devices. In the present exemplary embodiment, a printer control module 421, which controls the printer I/F 207, and a scanner control module 422, which controls the scanner I/F 208, are provided. Further, an I/F control module 424 and a UI control module 425 are also provided. The I/F control module 424 controls the USB I/F 210 and the network I/F 211, which are used for communication with the host computer 300. The UI control module 425 controls the operation unit I/F 209, which is used for communication with the UI unit 215.

For example, if the user inputs a "copy" command through the operation unit 500 illustrated in FIG. 2, the UI control module 425 detects the "copy" command and notifies the application 410 of the "copy" command. In the application 410, based on a "copy" job, a function management application (hereinafter, "function management APL") 411 generates a scan job and a print job and notifies a job management application (hereinafter, "job management APL") 412 of the scan job and the print job. The job management APL 412 causes the scanner unit 214 to execute a scanning operation, using the scanner control module 422 of the middleware 420 and stores acquired image data in the RAM 204. In this process, if some image processing or correction is required, the image processing unit 216 is used.

When the image data is stored in the RAM 204, then next, the job management APL 412 causes the printer unit 213 to execute a recording operation, using the printer control module 421. Specifically, the job management APL 412 transmits the image data stored in the RAM 204 to the printer unit 213 via the printer I/F 207. Then, the printer unit 213 receives the image data and records an image on a sheet according to the image data. Also in this process, if some image processing or correction is required, the image processing unit 216 is used.

Figure 5:
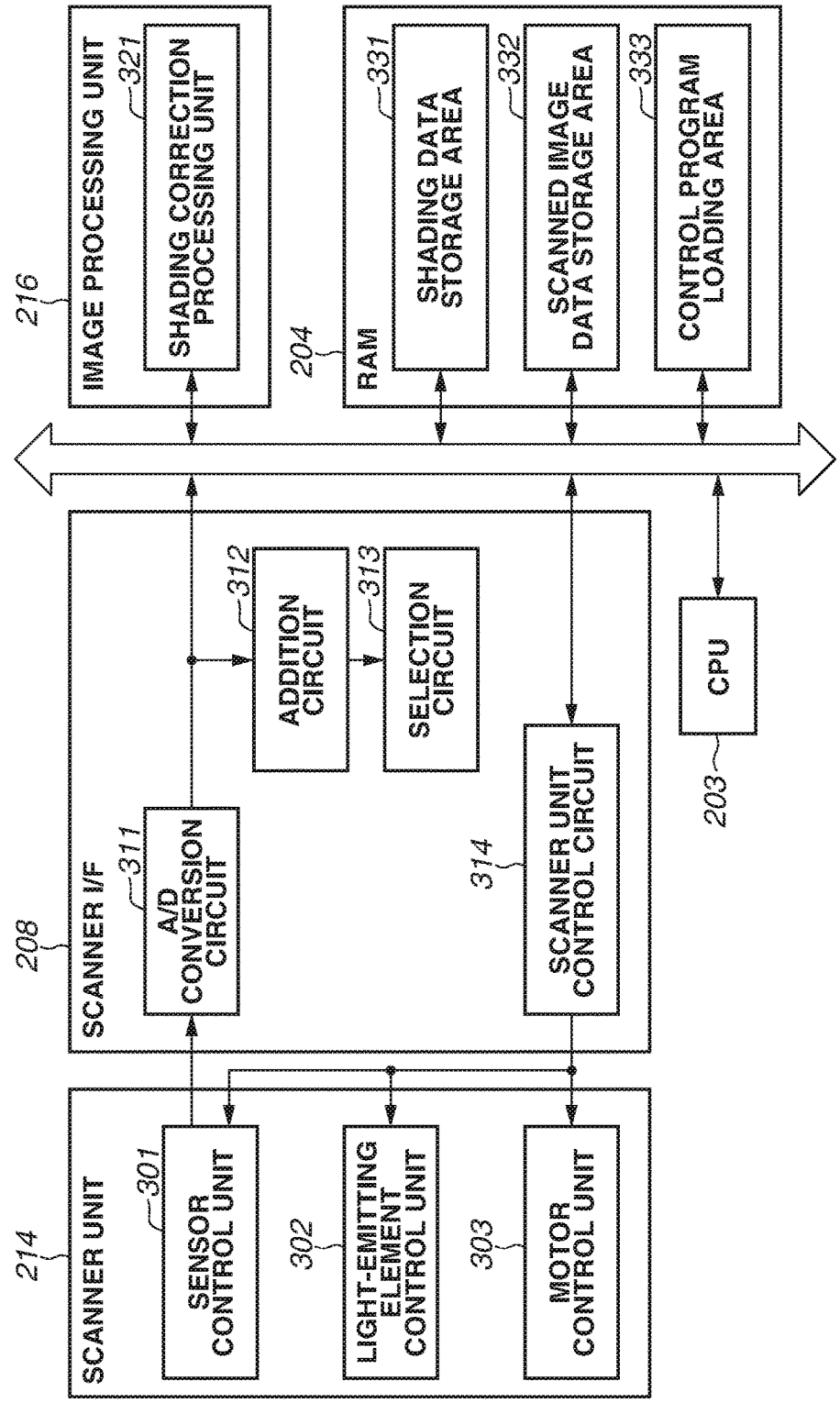
FIG. 5 is a block diagram illustrating a hardware configuration regarding a scanner unit.

FIG. 5 is a block diagram illustrating a hardware configuration regarding the scanner unit 214. The scanner unit 214 includes a sensor control unit 301, which controls the image sensor array 113 of the CIS 120, a light-emitting element control unit 302, which controls the light-emitting element array 111 of the CIS 120, and a motor control unit 303, which controls the motor for moving the CIS 120.

The scanner I/F 208 includes an analog-to-digital (A/D) conversion circuit 311 and a scanner unit control circuit 314. The scanner unit control circuit 314 is a circuit for controlling the entirety of the scanner unit 214. For example, via the light-emitting element control unit 302, the scanner unit control circuit 314 sequentially causes the R, G, and B light-emitting elements of the light-emitting element array 111 to emit light, while moving the CIS 120 at a predetermined speed via the motor control unit 303. Further, via the sensor control unit 301, the scanner unit control circuit 314 causes the image sensors of the image sensor array 113 to transmit analog signals detected in synchronization with the timing of the above light emission. The A/D conversion circuit 311 converts the analog signals acquired from the sensor control unit 301 into digital signals and transfers the digital signals to an area specified in the image processing unit 216 or the RAM 204. The scanner I/F 208 also includes an addition circuit 312 and a selection circuit 313, which are used in a shading correction process which will be described below.

With reference to flowcharts, a description is given of various processes related to a reading operation according to one or more embodiments. In the present exemplary embodiment, the CPU 203 reads and executes the scanner control module 422 (software) illustrated in FIG. 4, to execute processes in the flowcharts by using the hardware configuration illustrated in FIG. 5. In the present exemplary embodiment, the image reading apparatus may include a plurality of CPUs, and at least one of the plurality of CPUs may execute the processes in the flowcharts. Alternatively, each of the plurality of CPUs may execute a different process. For example, among the plurality of CPUs, the first CPU may perform the first process, and the second CPU may perform the second process.

Figure 6:
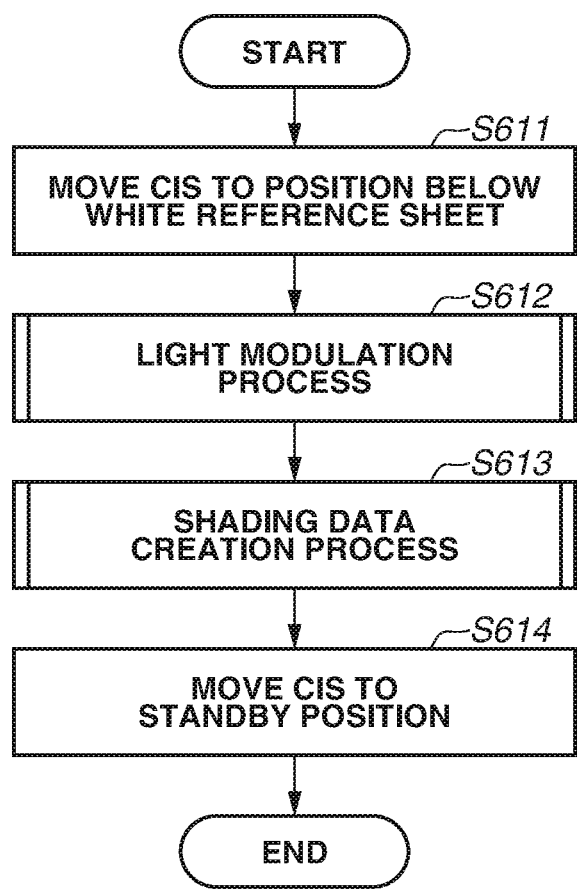
FIG. 6 is a flowchart illustrating a shading process.

FIG. 6 is a flowchart illustrating the process of obtaining a correction coefficient for a shading process. This process is the process of obtaining, for each image sensor, a correction coefficient for reducing variation in detection of the plurality of image sensors included in the CIS 120, and is performed at appropriate timing, such as when the MFP 100 is turned on, or immediately before a reading operation is performed.

When this process is started, in step S611, the scanner control module 422 moves, via the motor control unit 303, the CIS 120 to a position directly below the white reference sheet 114. In step S612, the scanner control module 422 executes a light modulation process. The light modulation process is the process of adjusting, for each color, a light emission time to the one suitable for the image sensor array 113.

FIG. 7 is a flowchart illustrating the details of the light modulation process. When this process is started, in step S621, the scanner control module 422 sets one of R, G, and B colors that has not yet been subjected to the light modulation process. Then, the processing proceeds to step S622. In step S622, the scanner control module 422 sets a lighting time T for the set color to a maximum time Tmax, which is determined in advance (T=Tmax).

In step S623, the scanner control module 422 lights the light-emitting elements of the currently set color for the lighting time T. Light emitted by this lighting is reflected from the white reference sheet 114 and received by the plurality of image sensors arranged in the image sensor array 113.

When the lighting time T elapses, the scanner control module 422 extinguishes the light-emitting elements, and the processing proceeds to step S624. In step S624, using the A/D conversion circuit 311, the scanner control module 422 converts analog signals output from the image sensors according to the above-described light reception into digital signals to acquire 16-bit output values O.

In step S625, the scanner control module 422 selects a maximum value Omax from among the plurality of output values O each corresponding to a different one of the plurality of respective image sensors acquired in step S624 and compares the maximum value Omax with an upper limit value Osat, which is set in advance. The upper limit value Osat indicates the saturation value of an image sensor. If the output value O of the image sensor exceeds the upper limit value Osat, this means that the amount of luminescence of the light-emitting elements is too large, and therefore, the image sensor cannot distinguish contrast of an image. In the present exemplary embodiment, under the condition that none of the image sensors becomes saturated, the maximum value Omax is compared with the upper limit value Osat, to enable a reading operation to be performed with the largest possible amount of luminescence, and whether the currently set lighting time T is appropriate is determined. In a case where the maximum value Omax exceeds the upper limit value Osat (YES in step S625), the processing proceeds to step S626. In step S626, to reduce the amount of luminescence, the scanner control module 422 reduces the lighting time T by Ts from the current value. Then, the processing returns to step S623.

Meanwhile, in a case where it is determined in step S625 that the maximum value Omax does not exceed the upper limit value Osat (NO in step S625), the processing proceeds to step S627. In step S627, the scanner control module 422 sets a light emission time T0 for the set color to the current lighting time T (T0=T). Steps S626 and S627 are repeated while the lighting time T is thus gradually reduced. Consequently, a maximum light emission time under the condition that none of the image sensors becomes saturated is set as the final light emission time T0.

In step S628, the scanner control module 422 determines whether the light emission time T0 is set for all the colors. In a case where there still remains a color for which the light emission time T0 should be set (NO in step S628), the processing returns to step S621. In step S621, the scanner control module 422 sets a next color for which the light emission time T0 has not yet been set. Then, the scanner control module 422 performs a light emission time setting process (steps S622 to S627) for the set color. In a case where, on the other hand, it is determined that the light emission time T0 is set for all the colors (YES in step S628), this process ends. Then, the processing returns to the flowchart in FIG. 6.

The light emission time T0 for each color determined by the light modulation process described with reference to FIG. 7 is used in common in various processes to be subsequently performed. Specifically, the light emission time T0 is used in a shading data creation process, which is performed in step S613 in FIG. 6. Additionally, the light emission time T0 is also used when a reading operation for reading an actual image is performed, and also used when the opening/closing state of a cover is confirmed.

FIG. 8 is a flowchart illustrating the shading data creation process executed in step S613 in FIG. 6. When this process is started, in step S631, according to the light emission time T0 set for each color, the scanner control module 422 lights the light-emitting elements of the respective colors in order. Light emitted by this lighting is reflected from the white reference sheet 114 and received by the plurality of image sensors. In step S632, the scanner control module 422 causes the A/D conversion circuit 311 to convert output signals from the image sensors into digital signals to obtain a plurality of output values Osh_on. Then, the scanner control module 422 stores the plurality of output values Osh_on in the RAM 204 in a manner such that each of the plurality of output values Osh_on is associated with a corresponding one of the image sensors.

In this process, the scanner control module 422 can employ various methods as a method for acquiring the output values Osh_on. For example, the scanner control module 422 can perform a light emission step in step S631 and a light reception step in step S632 multiple times and set the average values of output values detected multiple times, as the output values Osh corresponding to the image sensors. In this case, the scanner control module 422 may perform the light emission step and the light reception step multiple times while moving the CIS 120 in the y-direction. If the scanner control module 422 excludes maximum values and minimum values of the output values detected multiple times and then calculates the average values, it is possible to mitigate the influence of dust attached to the white reference sheet 114 or an abnormality.

In step S633, the scanner control module 422 selects a maximum value Osh_max and a minimum value Osh_min for each of R, G, and B from among the plurality of output values Osh_on acquired in step S632 and stores the maximum value Osh_max and the minimum value Osh_min in a shading data storage area 331. In this process, the output values Osh corresponding to all the image sensors arranged in the x-direction are not necessarily set as selection targets of the maximum value Osh_max and the minimum value Osh_min. For example, as illustrated in FIG. 1C, if the CIS 120 is larger than the width in the x-direction of the contact glass 115 or the white reference sheet 114, only output values Osh included in an area corresponding to the contact glass 115 or the white reference sheet 114 are set as selection targets. The maximum value Osh_max and the minimum value Osh_min stored in this step are subsequently used to execute a reading process for reading an actual image.

The acquisition of the output values Osh_on in step S632 and the selection of the maximum value Osh_max and the minimum value Osh_min in step S633 may be performed using the addition circuit 312 and the selection circuit 313, which are provided in the scanner I/F 208 as illustrated in FIG. 5.

In step S634, the scanner control module 422 extinguishes all the light-emitting elements. Then, in step S635, the scanner control module 422 acquires output values Osh_off of the respective image sensors in the state where the light-emitting elements remain extinguished. Then, the scanner control module 422 stores the output values Osh_off in the RAM 204 in such a manner that each of the output values Osh_off is associated with a corresponding one of the plurality of image sensors. As a specific method for acquiring the output values Osh_off, various methods can be employed, similarly to the acquisition of the output values Osh_on.

In step S636, based on the output values Osh_on stored in step S632 and the output values Osh_off stored in step S635, the scanner control module 422 generates shading data of a corresponding one of the image sensors. As a method for calculating the shading data, a known technique can be employed. Then, the scanner control module 422 stores the shading data in the shading data storage area 331 of the RAM 204 in such a manner that the shading data is associated with a corresponding one of the image sensors. After the storing of the shading data is completed, the scanner control module 422 deletes the output values Osh_on and the output values Osh_off that are temporarily stored. This process ends accordingly, and the processing returns to the flowchart in FIG. 6.

Figure 14:
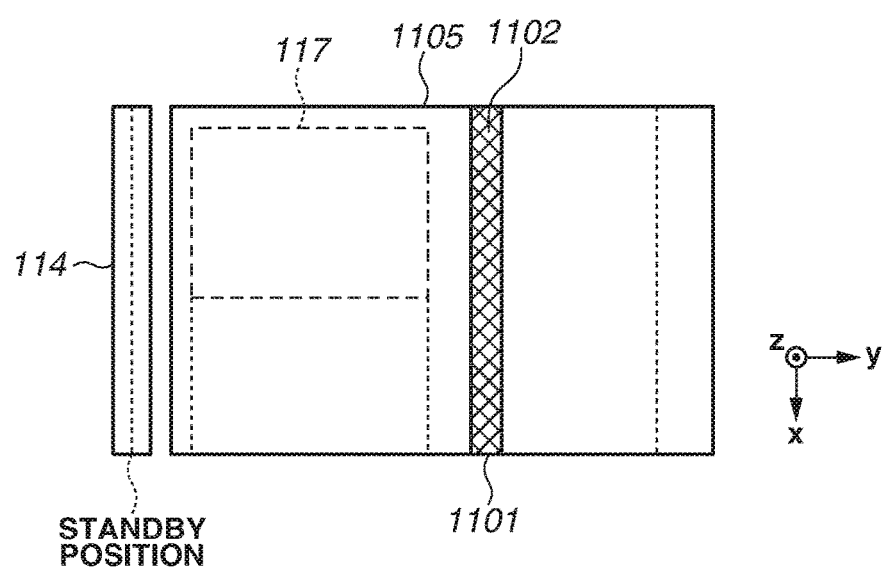
FIG. 14 is a top view illustrating a cover opening/closing detection position.

Referring back to FIG. 6, after the shading data creation process in step S613 is completed, the processing proceeds to step S614. In step S614, the scanner control module 422 moves the CIS 120 to a standby position. The shading process in FIG. 6 is completed accordingly. An example of the standby position is illustrated in FIG. 14.

It is desirable that the shading process described with reference to FIG. 6 should be executed for each reading resolution, and shading data should be stored for each reading resolution. For example, 2592 pieces of data associated with a resolution of 300 dpi, 5184 pieces of data associated with a resolution of 600 dpi, and 1296 pieces of data associated with a resolution of 150 dpi may be stored in different areas.

FIG. 9 is a flowchart illustrating a document reading process performed by the scanner unit 214. This process is started when the user inputs a command including a reading operation through the operation unit 500 or the host computer 300.

When this process is started, in step S7000, the scanner control module 422 sets a mode for the reading operation. Specifically, the scanner control module 422 acquires information, such as the reading resolution, the document size, the number of pages of the document, and a color mode or a monochrome mode, from the job management APL 412. This information may be input by the user. Alternatively, the information may be automatically acquired by pre-scanning with the CIS 120 in the state where the document S is set on the contact glass 115. Acquiring the information prior to the actual reading operation allows the scanner control module 422 to set in advance various conditions necessary when the reading operation is performed. For example, after setting the reading resolution, it becomes possible to set the number and the positions of image sensors of which the output values are valid, and the moving speed of the CIS 120. Further, after setting the document size, it becomes possible to determine the effective range of the image sensors arranged in the CIS 120 and the movement range of the CIS 120. Furthermore, after setting the color mode or the monochrome mode, it becomes possible to determine the colors of the light-emitting elements for which outputs are valid. In the case where the color mode is set, for example, it is possible to set in advance the use of output values for all of R, G, and B. In the case where the monochrome mode is set, it is possible to set in advance the use of output values for only green (G).

In step S7001, the scanner control module 422 moves the CIS 120 to a reading start position and initializes parameters Line_cnt and Doc_on_flg. The parameter Line_cnt indicates the number of lines on which the presence of a document is confirmed, among a plurality of lines (pixel rows) arranged in the y-direction. Further, the parameter Doc_on_flg indicates whether a flag is set to "on", which indicates that the document S is placed on the document platen 101, or "off", which indicates that the document S is not placed on the document platen 101. In step S7001, these parameters are set such that Line_cnt=0 and Doc_on_flg=off.

In step S7002, the scanner control module 422 moves the CIS 120 to a reading target line. In step S7003, the scanner control module 422 acquires output signals for a single line. Specifically, the scanner control module 422 lights the light-emitting elements based on the light emission time T0 and acquires digital output values from the image sensors. Further, the scanner control module 422 corrects the digital output values using the shading data stored in the shading data storage area 331 and then stores the corrected digital output values as final reading data in a scanned image data storage area 332. In this process, the correction calculation can be made using a shading correction processing unit 321, which is provided in the image processing unit 216. Meanwhile, the digital output values before being corrected are also used in a document presence/absence determination process, which will be performed in the next step. Thus, the scanner control module 422 stores the digital output values before being corrected.

In step S7004, the scanner control module 422 executes the document presence/absence determination process to determine whether a document is present on the current reading line. The document presence/absence determination process will be described in detail below.

In a case where the result of the determination based on the process in step S7004 indicates that "a document is present on the current reading line" (YES in step S7005), the processing proceeds to step S7006. In step S7006, the scanner control module 422 increments Line_cnt, and the processing proceeds to step S7007. Further, in step S7007, the scanner control module 422 determines whether the current value of Line_cnt exceeds a threshold Line_cnt_on, which is determined in advance.

The threshold Line_cnt_on in the present exemplary embodiment corresponds to the number of successive lines on which "a document is present" according to the determination based on the process in step S7004, and which is sufficient to conclude that "a document is placed on the document platen". The threshold Line_cnt_on can be set to the number of lines corresponding to the range of about 2 mm, for example. Even if "a document is present" on one to several successive lines according to the determination based on the process in step S7004, it is not sufficient to conclude that "a document is actually placed on the document platen", considering the attachment of dust. In the present exemplary embodiment, a step of comparing the number of successive lines on which "a document is present" according to the determination with the threshold Line_cnt_on is provided. It is therefore possible to definitely determine whether "a document is placed on the document platen".

In step S7007, in a case where it is determined that Line_cnt>Line_cnt_on (YES in step S7007), the processing proceeds to step S7008. In step S7008, the scanner control module 422 sets Doc_on_flg=on, and then, the processing proceeds to step S7010. In a case where it is determined in step S7007 that Line_cnt<Line_cnt_on (NO in step S7007), the processing immediately proceeds to step S7010. Meanwhile, in a case where it is determined in step S7005 that "a document is not present on the current line" (NO in step S7005), the processing proceeds to step S7009. In step S7009, the scanner control module 422 resets Line_cnt, and the processing proceeds to step S7010.

In step S7010, the scanner control module 422 checks whether the reading of all the lines (corresponding to the number of pixels in the y-direction) set in step S7000 is completed. In a case where it is determined that there still remains a line to be read (NO in step S7010), the processing returns to step S7002. In step S7002, the scanner control module 422 moves the CIS 120 to the next line. In a case where the reading process for reading all the lines is completed, i.e., in a case where it is determined that the reading process for reading a single page is completed (YES in step S7010), the processing proceeds to step S7011.

In step S7011, the scanner control module 422 performs a document forgetting detection necessity determination process. This determination process will be described in detail below with reference to FIG. 12. In step S7012, the scanner control module 422 determines whether it is determined in step S7011 that document forgetting detection is necessary. In a case where it is determined that document forgetting detection is necessary (YES in step S7012), the processing proceeds to step S7013. In step S7013, the scanner control module 422 determines whether Doc_on_flg=on, i.e., whether a document is placed on the document platen 101. If Doc_on_flg=on (YES in step S7013), the processing proceeds to step S7014. In step S7014, the scanner control module 422 executes a document forgetting detection process, and then, this process ends. The document forgetting detection process will be described in detail below with reference to FIG. 13. Meanwhile, in a case where it is determined in step S7013 that Doc_on_flg=off (NO in step S7013), or in a case where it is determined in step S7012 that document forgetting detection is not necessary (NO in step S7012), the processing proceeds to step S7015. Then, in step S7015, the scanner control module 422 moves the CIS 120 to the standby position without executing the process of detecting the opening and closing of the document platen cover 102, and this process ends. This is the document reading process according to the present exemplary embodiment.

Image data stored in the scanned image data storage area 332 by repeating steps S7002 to S7010 is subsequently used in various manners. For example, if the "copy" key 501 is specified, the image data is used for a recording operation to be performed by the printer unit 213. Further, if the "scan and transmit" key 502 is specified, the image data is used as data for a transmission process using the network I/F 211.

FIG. 10 is a flowchart illustrating the document presence/absence determination process executed in step S7004 in FIG. 9. When this process is started, in step S7100, the scanner control module 422 determines whether Doc_on_flg=on. In a case where Doc_on_flg=on (YES in step S7100), it is determined that a document is placed on the document platen 101. Thus, this process immediately ends. Meanwhile, in a case where Doc_on_flg=off (NO in step S7100), the processing proceeds to step S7101.

In step S7101, the scanner control module 422 sets one of R, G, and B as a processing target color. Further, in step S7102, the scanner control module 422 selects a maximum value Ord_max and a minimum value Ord_min for the set target color from among the digital output values for the single line acquired in step S7003. The range where these values are selected corresponds to the range where the maximum value Osh_max and the minimum value Osh_min are selected in step S633 in FIG. 8. As a method for selecting these values, data temporarily stored in the RAM 204 may be searched, or the selection circuit 313, which is provided in the scanner I/F 208, is used.

In step S7103, the scanner control module 422 reads the maximum value Ord_max acquired in step S7102 and the maximum value Osh_max stored in the shading data storage area 331 in the shading process described with reference to FIG. 6 and determines whether there is a great change between these values. Specifically, using a threshold Tmax, which is set in advance, the scanner control module 422 determines whether condition 1 is satisfied.

$$\text{abs}(1-(Ord\_max/Osh\_max))>Tmax \quad \text{(condition 1)}$$

If condition 1 is satisfied (YES in step S7103), the processing proceeds to step S7105. In step S7105, the scanner control module 422 determines that "a document is present on the target line (the reading line on which the output values are acquired in step S7003)". Then, this process ends. If, on the other hand, it is determined that condition 1 is not satisfied (NO in step S7103), the processing proceeds to step S7104.

In step S7104, the scanner control module 422 reads the minimum value Ord_min acquired in step S7102 and the minimum value Osh_min stored in the shading data storage area 331 and determines whether there is a great change between these values. Specifically, using a threshold Tmin, which is set in advance, the scanner control module 422 determines whether condition 2 is satisfied.

$$\text{abs}(1-(Ord\_min/Osh\_min))>Tmin \quad \text{(condition 2)}$$

In a case where condition 2 is satisfied (YES in step S7104), the processing proceeds to step S7105. In step S7105, the scanner control module 422 determines that "a document is present on the target line". Then, this process ends. Meanwhile, in a case where it is determined that condition 2 is not satisfied (NO in step S7104), the processing proceeds to step S7106.

In step S7106, the scanner control module 422 determines whether the determination processes for all the colors are completed, i.e., whether there is a color for which the determination in step S7103 or S7104 has not yet been made. In a case where there is a color for which the determination in step S7103 or S7104 has not yet been made (NO in step S7106), the processing returns to step S7101. In step S7101, the scanner control module 422 changes the target color to a new color, and the processing proceeds to step S7102 again. Meanwhile, in a case where it is determined in step S7106 that the determination processes for all the colors are completed (YES in step S7106), the processing proceeds to step S7107. In step S7107, the scanner control module 422 determines that "a document is not present on the target line". Then, this process ends.

According to the above document presence/absence determination process, only if neither the maximum value Ord_max nor the minimum value Ord_min of the output values for all of R, G, and B colors greatly changes from the output values obtained when the shading process is performed, it is determined that "a document is not present". In all other cases, it is determined that "a document is present".

Figure 11A:
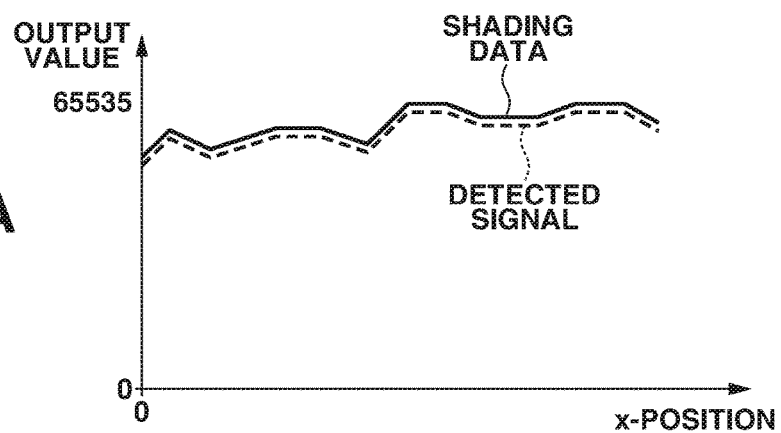
FIGS. 11A to 11C are diagrams illustrating specific examples of a determination in the document presence/absence determination process.
Figure 11B:
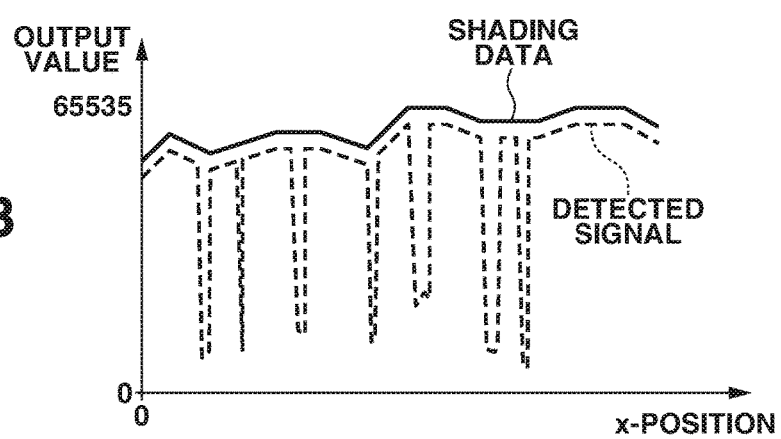
Figure 11C:
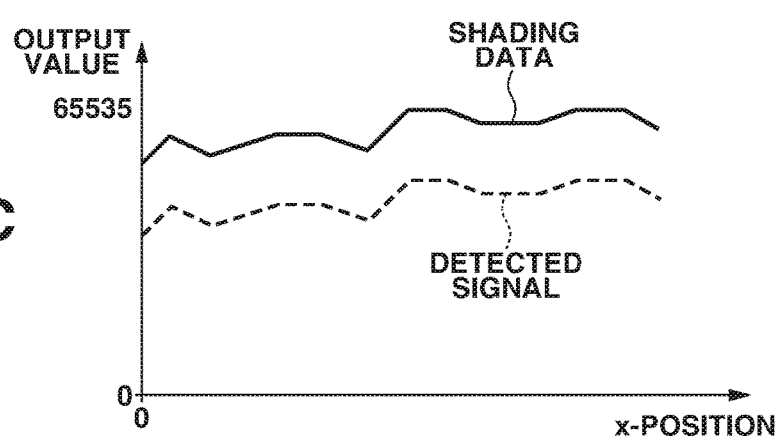

FIGS. 11A to 11C are diagrams illustrating specific examples of the determination in the document presence/absence determination process. A horizontal axis indicates the position of each image sensor in the x-direction on a determination target line, and a vertical axis indicates the output value of each image sensor. FIG. 11A illustrates a case where a document is not placed on the determination target line. FIG. 11B illustrates a case where a document in which characters are recorded on a white background is placed on the determination target line. FIG. 11C illustrates a case where a light green plain document is placed on the determination target line of the document platen 101. In all of FIGS. 11A to 11C, the output values on the determination target line in a case where the light-emitting elements of red (R) are used, are compared with detected values (shading data) in a case where the white reference sheet 114 is detected.

In a case where a document is not placed on the determination target line of the document platen 101, all the image sensors detect the white sheet 105, which is attached to the back surface of the document platen cover 102. Thus, as illustrated in FIG. 11A, the output values are similar to the shading data. In this case, neither the maximum value Ord_max nor the minimum value Ord_min of the output values greatly changes from the maximum value Osh_max or the minimum value Osh_min of the shading data. Then, the same applies to a case where the light emission color is green (G) or blue (B). As a result, in step S7107, it is determined that "a document is not present on the target line".

In a case where a document is placed on the determination target line of the document platen 101, the output value of an image sensor at a position corresponding to a black character is low, and the output value of an image sensor at a position corresponding to a blank area is high. In the shape of these output values, depressions and protrusions appear as in FIG. 11B. Thus, the minimum value Ord_min decreases more significantly than the minimum value Osh_min of the shading data. As a result, in step S7105, it is determined that "a document is present on the target line".

In a case where a light green plain document is placed on the determination target line of the document platen 101, all the image sensors detect light green in common. Thus, as illustrated in FIG. 11C, the output results of the image sensors have overall low values in a shape almost equivalent to that of the shading data. Thus, both the maximum value Ord_max and the minimum value Ord_min of the output values are smaller than the maximum value Osh_max and the minimum value Osh_min of the shading data. As a result, in step S7105, it is determined that "a document is present on the target line".

However, in a case where the color of a plain document is not light green but pink, and if the light emission color is red, the output results are as in FIG. 11A. Also in view of such a situation, in the present exemplary embodiment, detection is made for all of R, G, and B colors. Then, in at least one of these colors, if either one of the maximum value Ord_max and the minimum value Ord_min of the output values greatly changes from the output values obtained when the shading process is performed, it is possible to determine that "a document is present". As described above, in the document presence/absence determination process according to the present exemplary embodiment, it is possible to determine the presence or absence of a document, regardless of the color of the background of a document or the color of an image.

The thresholds Tmax and Tmin only need to be appropriately adjusted according to the whiteness of the white sheet 105, and are not particularly limited. If the whiteness of the white sheet 105 is sufficiently close to that of the white reference sheet 114, the thresholds Tmax and Tmin can be set to about 0.2, for example.

FIG. 12 is a flowchart illustrating the document forgetting detection necessity determination process executed in step S7011 in FIG. 9. When this process is started, in step S1201, the scanner control module 422 checks whether the current reading process is "an actual reading process for acquiring desired image data". For example, in the case of a reading process for pre-scanning a document, or a reading process for reading a test pattern for automatically adjusting the recording position of the printer unit 213, it is determined that the current reading process is not "an actual reading process for acquiring desired image data" (NO in step S1201). Then, in this case, the processing jumps to step S1206. In step S1206, the scanner control module 422 makes a setting such that "document forgetting detection is not necessary". Then, this process ends. Meanwhile, in a case where the current reading process is a document reading operation other than a pre-scanning operation or the like, that is, the current reading process is "an actual reading process for acquiring desired image data" (YES in step S1201), the processing proceeds to step S1203.

In step S1203, the scanner control module 422 checks the mode set in step S7000 and determines whether the currently executed reading operation is a reading operation for reading a document including a plurality of pages. For example, a case where the user selects N-in-1 copying (N is an integer greater than 1) or two-sided copying as a setting when selecting "copy" in FIG. 2 corresponds to a reading operation for reading a document including a plurality of pages. As a matter of course, a case where the functions of both N-in-1 copying and two-sided copying are set also corresponds to a reading operation for reading a document including a plurality of pages. If these functions are selected, and the user places the first document on the document platen 101 and gives an instruction to start reading, a scanning process for scanning the first document is executed. Then, after the scanning process for scanning the first document is completed, a "start reading" button and a "start printing" button are displayed on the operation unit 500. "The first document" corresponds to a single surface of the document placed on the document platen 101. In this process, if the user places the second document on the document platen 101 and gives an instruction to start reading, a scanning process for scanning the second document is executed. Then, after the scanning process for scanning the second document is completed, the "start reading" button and the "start printing" button are displayed again on the operation unit 500. In this process, in a case where N-in-1 copying (N is an integer greater than 1) is selected, and if the "start printing" button is pressed, a print product subjected to N-in-1 copying (N is an integer greater than 1) is output. In a case where two-sided printing is selected, and if the "start printing" button is pressed, a print product subjected to two-sided printing is output. The display control of the "start reading" button and the "start printing" button is executed every time the reading of a single document is completed. In a case where it is determined that a document including a plurality of pages is not present (NO in step S1203), there is a possibility that the forgetting of a document occurs in the current page. Thus, the processing proceeds to step S1207. In step S1207, the scanner control module 422 makes a setting such that "document forgetting detection is necessary". Then, this process ends. For example, a case where at least one of two-sided printing and N-in-1 copying (N is an integer greater than 1) is not selected corresponds to a case where the determination is NO in step S1203. Meanwhile, in a case where it is confirmed that a document including a plurality of pages is present (YES in step S1203), the processing proceeds to step S1204.

In step S1204, the scanner control module 422 determines whether the reading operation for reading the current page is normally completed. In a case where it is determined that the reading operation for reading the current page is not normally completed (NO in step S1204), there is a possibility that the forgetting of a document occurs in the current page. Thus, the processing proceeds to step S1207. In step S1207, the scanner control module 422 makes a setting such that "document forgetting detection is necessary". Then, this process ends. In this process, a case where the reading operation for reading the current page is not normally completed corresponds to a case where an operation error occurs or a case where a cancellation command interrupts. For example, if 2-in-1 copying is selected, and the fifth document among 10 documents to be read is placed on the document platen 101, and the "start reading" button is selected, the fifth document is scanned. If an error occurs at this scanning, although the user does not press the "start printing" button, the fifth document is treated as the last document. Thus, it is necessary to perform forgetting detection on the fifth sheet as the last document. Thus, if the determination is NO in step S1204 (NO in step S1204), the processing proceeds to step S1207. Meanwhile, in a case where it is determined that "the reading operation for reading the current page is normally completed" (YES in step S1204), the processing proceeds to step S1205.

In step S1205, the scanner control module 422 determines whether the current page is the last page. In a case where the current page is the last page (YES in step S1205), there is a possibility that the forgetting of a document occurs in the current page. Thus, the processing proceeds to step S1207. In step S1207, the scanner control module 422 makes a setting such that "document forgetting detection is necessary". Then, this process ends. Meanwhile, in a case where the current page is not the last page (NO in step S1205), it is clear that the user will perform the work of setting a document of the next page. Thus, the processing proceeds to step S1206. In step S1206, the scanner control module 422 makes a setting such that "document forgetting detection is not necessary". Then, this process ends.

The determination of whether the current page is the last page is made based on, as an example, whether the "start printing" button is pressed. For example, if 2-in-1 copying is selected, and the fifth document is placed on the document platen 101, and the "start reading" button is selected, the fifth document is scanned. Then, after the scanning process for scanning the fifth document is completed, the "start reading" button and the "start printing" button are displayed on the operation unit 500. In this process, if the user selects the "start printing" button, the fifth document is treated as the last document. Thus, if the "start printing" button is pressed, the determination is YES in step S1205, and the processing proceeds to step S1207. Alternatively, as another determination method in step S1205, for example, every time scanning is completed, an "end reading" button may be displayed, and the determination may be made in step S1205 based on whether the "end reading" button is selected.

That is, in FIG. 12, every time a reading process for reading a document for a single page is executed, a screen allowing the selection of whether the execution of the reading process is to continue (a screen including the "start reading" button) is displayed. Then, if a selection is made such that the execution of the reading process is not to continue (if the "start reading" button is not pressed, and the "start printing" button is pressed), document forgetting detection is executed.

In the present exemplary embodiment, by the above-described process, it is determined that the detection process is not necessary for pages other than the last page of the document, and it is determined that the detection process is necessary for only the last page of the document. Alternatively, as another process, the image reading apparatus may execute the process of determining that the detection process is not necessary for at least one page other than the last page of the document, and determining that the detection process is necessary for the last page of the document. In this case, if it is determined in step S1205 that "document forgetting detection is not necessary" for at least one page, the scanner control module 422 determines that "document forgetting detection is necessary" for the subsequent pages.

Figure 13B:
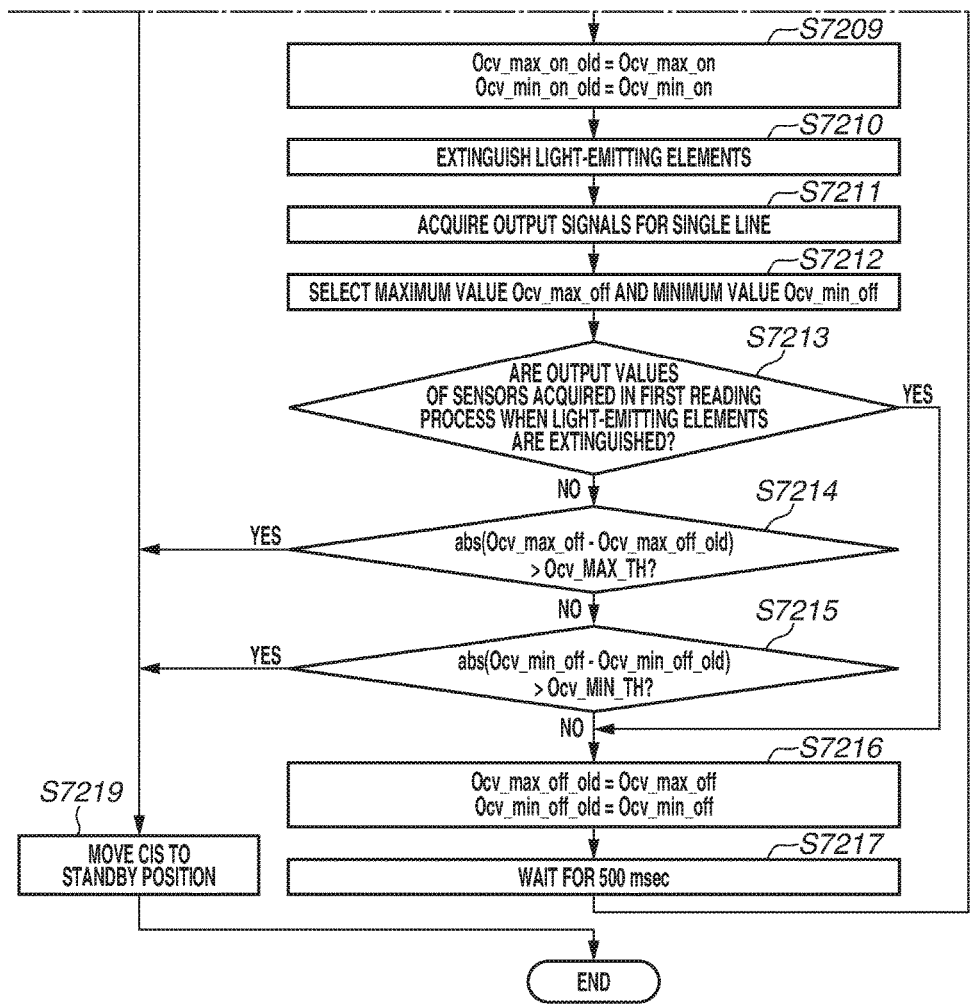
FIG. 13 is a diagram including flowcharts of FIGS. 13A and 13B.

FIG. 13 is a flowchart illustrating the document forgetting detection process executed in step S7014 in FIG. 9. When the user removes a document from the document platen 101, the document platen cover 102 is opened and closed. In view of such a situation, this process is for detecting the opening and closing of the document platen cover 102, determining the forgetting of a document, and warning the user.

When this process is started, in step S7201, the CPU 203 places the CIS 120 at a cover opening/closing detection position. FIG. 14 is a top view illustrating a cover opening/closing detection position 1101. In the present exemplary embodiment, the cover opening/closing detection position 1101 is a position sufficiently distant from the white reference sheet 114 in the y-direction such that even in the state where a document is placed on the document platen 101, the document is not present at this position. At such a position, a target to be detected by the CIS 120 is the white sheet 105, regardless of whether a document is set on the document platen 101. With reference to FIG. 1C, however, the document S has a thickness. Thus, when a document is set on the document platen 101, a space occurs to some extent between the contact glass 115 and the white sheet 105. Then, due to the influence of this space, the output value of the CIS 120 is smaller in a case where a document is set on the document platen 101 than in a case where a document is not set on the document platen 101. In the present exemplary embodiment, using such characteristics, the scanner control module 422 periodically detects the output results from the CIS 120. Then, if a change is observed in the output results between detection operations, the scanner control module 422 determines that the document platen cover 102 is opened and closed between these detection operations. The CIS 120 may be moved in step S7201 as the continuation of the movement for the reading operation repeatedly executed in FIG. 9 (step S7002).

Figure 15:
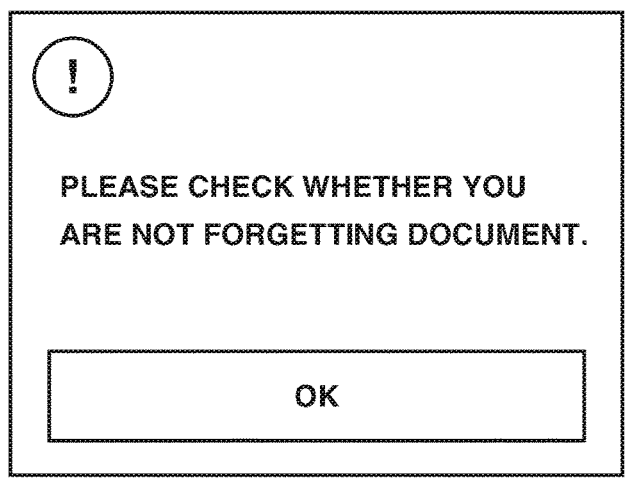
FIG. 15 is an example of display for warning that a document is forgotten.

In step S7202, the scanner control module 422 determines whether a predetermined time has elapsed since this process (the document platen cover opening/closing detection process) has been started. The predetermined time is a time sufficient to determine that after a reading operation for reading a document ends, the document is forgotten to be removed. The predetermined time can be set to about one minute, for example. In a case where it is determined in step S7202 that the predetermined time has elapsed (YES in step S7202), it is highly likely that the user is forgetting a document. Thus, the processing proceeds to step S7218. In step S7218, the scanner control module 422 warns the user through the UI unit 215 or the host computer 300 that a document is forgotten to be removed. Although a method for warning the user is not particularly limited, for example, display as illustrated in FIG. 15 may be performed through a liquid crystal display unit of the main body of the MFP 100 or a monitor of the host computer 300, or a warning sound may be produced.

After the above warning is given, the processing proceeds to step S7219. In step S7219, the scanner control module 422 returns the CIS 120 to the standby position, and this process ends. Meanwhile, in a case where it is determined in step S7202 that the predetermined time has not yet elapsed (NO in step S7202), the processing proceeds to step S7203 so that the scanner control module 422 detects the opening and closing of the cover.

In step S7203, based on the light emission time T0 set in the light modulation process, the scanner control module 422 lights the light-emitting elements in the order of colors. In step S7204, the scanner control module 422 obtains output values for a single line. Further, in step S7205, the scanner control module 422 selects a maximum value Ocv_max_on and a minimum value Ocv_min_on from among these plurality of output values.

In step S7206, the scanner control module 422 determines whether the current maximum value Ocv_max_on and the current minimum value Ocv_min_on are output values acquired in the first reading process when the light-emitting elements are lit after this process is started. In a case where the current maximum value Ocv_max_on and the current minimum value Ocv_min_on are output values acquired in the first reading process (YES in step S7206), the processing jumps to step S7209. In a case where it is determined that the current maximum value Ocv_max_on and the current minimum value Ocv_min_on are not output values acquired in the first reading process (NO in step S7206), the processing proceeds to step S7207.

In step S7207, the scanner control module 422 determines whether the current maximum value Ocv_max_on changes from a maximum value Ocv_max_on_old, which is obtained in the previous detection process. Specifically, using a threshold Ocv_MAX_TH, which is set in advance, the scanner control module 422 determines whether condition 3 is satisfied.

$$abs((Ocv\_max\_on - Ocv\_max\_on\_old) > Ocv\_MAX\_TH \quad \text{(condition 3)}$$

In a case where condition 3 is satisfied (YES in step S7207), it can be determined that the document platen cover 102 is opened and closed. Thus, the processing proceeds to step S7219. In step S7219, the scanner control module 422 returns the CIS 120 to the standby position, and this process ends. If condition 3 is not satisfied (NO in step S7207), the processing proceeds to step S7208.

In step S7208, the scanner control module 422 determines whether the current minimum value Ocv_min_on changes from a minimum value Ocv_min_on_old, which is obtained in the previous detection process. Specifically, using a threshold Ocv_MIN_TH, which is set in advance, the scanner control module 422 determines whether condition 4 is satisfied.

$$abs((Ocv\_min\_on - Ocv\_min\_on\_old) > Ocv\_MIN\_TH \quad \text{(condition 4)}$$

In a case where condition 4 is satisfied (YES in step S7208), it can be determined that the document platen cover 102 is opened and closed. Thus, the processing proceeds to step S7219. In step S7219, the scanner control module 422 returns the CIS 120 to the standby position, and this process ends. In a case where condition 4 is not satisfied (NO in step S7208), the processing proceeds to step S7209.

In step S7209, the scanner control module 422 replaces the current maximum value Ocv_max_on with the previous maximum value Ocv_max_on_old and replaces the current minimum value Ocv_min_on with the previous minimum value Ocv_min_on_old.

In step S7210, the scanner control module 422 extinguishes the light-emitting elements. In step S7211, the scanner control module 422 obtains output values for a single line. Further, in step S7212, the scanner control module 422 selects a maximum value Ocv_max_off and a minimum value Ocv_min_off from among these plurality of output values.

In step S7213, the scanner control module 422 determines whether the current maximum value Ocv_max_off and the current minimum value Ocv_min_off are output values acquired in the first reading process when the light-emitting elements are extinguished after this process is started. In a case where the current maximum value Ocv_max_off and the current minimum value Ocv_min_off are output values acquired in the first reading process (YES in step S7213), the processing jumps to step S7216. In a case where it is determined that the current maximum value Ocv_max_off and the current minimum value Ocv_min_off are not output values acquired in the first reading process (NO in step S7213), the processing proceeds to step S7214. In step S7214, the scanner control module 422 determines whether the current maximum value Ocv_max_off changes from a previous maximum value Ocv_max_off_old. Specifically, using the threshold Ocv_MAX_TH, the scanner control module 422 determines whether condition 5 is satisfied.

$$\mathrm{abs}((Ocv\_max\_off - Ocv\_max\_off\_old)) > Ocv\_MAX\_TH \quad \text{(condition 5)}$$

In a case where condition 5 is satisfied (YES in step S7214), it can be determined that the document platen cover 102 is opened and closed. Thus, the processing proceeds to step S7219. In step S7219, the scanner control module 422 returns the CIS 120 to the standby position, and this process ends. In a case where condition 5 is not satisfied (NO in step S7214), the processing proceeds to step S7215.

In step S7215, the scanner control module 422 determines whether the current minimum value Ocv_min_off changes from a previous minimum value Ocv_min_off_old. Specifically, using the threshold Ocv_MIN_TH, the scanner control module 422 determines whether condition 6 is satisfied.

$$\mathrm{abs}((Ocv\_min\_off - Ocv\_min\_off\_old)) > Ocv\_MIN\_TH \quad \text{(condition 6)}$$

In a case where condition 6 is satisfied (YES in step S7215), it can be considered that the document platen cover 102 is opened and closed. Thus, the processing proceeds to step S7219. In step S7219, the scanner control module 422 returns the CIS 120 to the standby position, and this process ends. In a case where condition 6 is not satisfied (NO in step S7215), the processing proceeds to step S7216.

In step S7216, the scanner control module 422 replaces the current maximum value Ocv_max_off with the previous maximum value Ocv_max_off_old and replaces the current minimum value Ocv_min_off with the previous minimum value Ocv_min_off_old, and the processing proceeds to step S7217. In step S7217, the scanner control module 422 waits for 500 msec without executing any process, and the processing returns to step S7202.

According to the above document platen cover opening/closing detection process, if a document is removed in the predetermined time (within one minute), a certain difference appears between two output values acquired at an interval of 500 msec. Then, in this case, as a result of any of steps S7207, S7208, S7214, and S7215, this process ends not through the step of warning the user that a document is forgotten to be removed (step S7218). If, on the other hand, a document is not removed in the predetermined time, the processing proceeds to step S7218. In step S7218, using a warning sound or warning display, the user is warned that a document is forgotten to be removed.

If a new reading command is input while the document platen cover opening/closing detection process is being performed, the processing may immediately proceed to step S7219, and this process may end. Then, a new reading operation may be started. In view of such a situation, the cover opening/closing detection position can also be provided on the reference position side in advance with respect to the document S. In this case, however, the difference between two output values is not a difference occurring due to the presence or absence of a space, but the difference between an output value obtained when a document is detected and an output value obtained when the white sheet 105 is detected. The cover opening/closing detection position is provided near the reference position. Consequently, it is possible to reduce the time required to return the CIS 120 to the reference position and immediately start a reading operation after a command is input.

The determination of whether the document cover is opened and closed can be generally made only by the processes based on the output values obtained when the light-emitting elements are lit in steps S7203 to S7209. However, in the state where the cover is opened under an environment where external light, such as a white electric light, is present, then even if a document is removed, there is a case where the image sensors receive an amount of light equivalent to light emitted from the light-emitting elements of the CIS 120 and reflected from the document. Even in such a case, the processes based on the output values obtained when the light-emitting elements are extinguished as in steps S7210 to S7216 enables determination of the state where the document cover is opened to be made accurately. Thus, in the present exemplary embodiment, the opening and closing of the cover is determined based on both the processes based on the output values obtained when the light-emitting elements are lit in steps S7203 to S7209 and the processes based on the output values obtained when the light-emitting elements are extinguished as in steps S7210 to S7216.

The document forgetting detection process in which a reading operation and a plurality of determination processes are periodically repeated as illustrated in FIG. 13 is a method effective in making an accurate determination. However, in a case where a user handles a document including a plurality of pages and performs work without forgetting to remove a document, the user is troubled by the time spent on the determination processes and the unnecessary display of a warning asking whether the user is not forgetting a document.

Thus, in the present exemplary embodiment, referring back to FIG. 9, the document forgetting detection necessity determination process (step S7011) is performed prior to the document forgetting detection process (step S7014). Then, only if it is determined that document forgetting detection is necessary, the document forgetting detection process is performed. Further, also if, as a result of the document reading process, it is found that a document is not placed (Doc_on_flg=off), the document forgetting detection process (step S7014) is not performed based on the determination process in step S7013.

That is, according to the present exemplary embodiment, if the possibility that a document is forgotten to be removed is low, it is possible to avoid performing the document forgetting detection process (step S7014). Thus, the present exemplary embodiment enables the document forgetting detection to be performed efficiently, while reducing troublesomeness felt by the user.

In the above description, the configuration is such that an MFP is used as an example of the image reading apparatus. However, embodiments are not limited to this form. Any form can be employed as the image reading apparatus according to the present invention so long as a document is set, and a scanner function can read the document. Accordingly, the image reading apparatus can efficiently perform a document forgetting check process after an image is read.

Embodiments of the above can also be implemented by the process of supplying a program for achieving one or more functions of the above exemplary embodiment to a system or an apparatus via a network or a storage medium, and of causing one or more processors of a computer of the system or the apparatus to read and execute the program. Further, embodiments can also be implemented by a circuit (e.g., an application-specific integrated circuit (ASIC)) for achieving one or more functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-151329, filed Aug. 1, 2016, which is hereby incorporated by reference herein in its entirety.

What is claimed is:

1. An image reading apparatus comprising:
   a reader configured to read an image of a document set on a document platen;
   a document forgetting detection unit configured to execute a detection process for detecting whether the document has been forgotten on the document platen;
   a setting unit configured to set a first function related to reading process of a plurality of pages or a second function related to reading process of a single page; and
   a control unit configured to, in a case where the first function related to reading process of a plurality of pages is set, cause the document forgetting detection unit to perform a first detection process in which the detection process is not executed on at least a page other than a last page of the document and is executed on the last page of the document, and, in a case where the second function related to reading process of a single page is set, cause the document forgetting detection unit to perform a second detection process in which the detection process is executed on the read single page,
   wherein the document forgetting detection unit, the setting unit, and the control unit are implemented by at least one processor.

2. The image reading apparatus according to claim 1, further comprising
   a warning unit configured to warn a user in a case where the document forgetting detection unit detects the forgetting of the document,
   wherein the warning unit is implemented by the at least one processor.

3. The image reading apparatus according to claim 1, further comprising
   a determination unit configured to, every time after a reading process for reading an image for a single page is performed by the reading unit, determine whether the detection by the document forgetting detection unit is necessary,
   wherein in a case where a reading process for reading a last page among pages to be consecutively read by the reading unit is performed, the determination unit determines that the detection by the document forgetting detection unit is necessary, and in a case where a reading process for reading a page other than the last page is performed, the determination unit determines that the detection by the document forgetting detection unit is not necessary,
   wherein the determination unit is implemented by the at least one processor.

4. The image reading apparatus according to claim 3, wherein in a case where the reading process is canceled or a case where an error occurs, the determination unit determines that the detection by the document forgetting detection unit is necessary even in a case where a page to be read is not the last page of the document.

5. The image reading apparatus according to claim 3, wherein in a case where a reading process different from an actual reading process for acquiring desired image data is performed by the reading unit, the determination unit determines that the detection by the document forgetting detection unit is not necessary.

6. The image reading apparatus according to claim 1, further comprising
a display control unit configured to, in a case where the function of reading a document including a plurality of pages is set, display a screen allowing a selection of whether the execution of the reading process is to continue every time after a reading process for reading an image for a single page is executed,
wherein in a case where a selection in which the execution of the reading process is to continue is not made in the screen, the control unit controls the document forgetting detection unit to execute the detection process,
wherein the display control unit is implemented by the at least one processor.

7. The image reading apparatus according to claim 1, wherein the document forgetting detection unit detects the forgetting of the document by detecting whether a cover for covering the document set on the document platen is opened and closed.

8. The image reading apparatus according to claim 1,
wherein the reading unit acquires an output value of a reading sensor to perform a reading process for reading the document, the reading sensor moving relative to the document, and
wherein the document forgetting detection unit periodically acquires the output value of the reading sensor placed at a predetermined position to detect the forgetting of the document.

9. The image reading apparatus according to claim 1, wherein the first function is at least one of N-in-1 copying and two-sided copying, where N is an integer greater than 1.

10. An image reading method comprising:
reading an image of a document set on a document platen;
executing a detection process for detecting the document has been forgotten on the document platen;
setting a first functions related to read process of a plurality of pages or a second function related to read process of a single page; and
in a case where the first function related to reading process of a plurality of pages is set, performing a first detection process in which the detection process is not executed on at least a page other than a last page of the document, and is executed on the last page of the document, and
in a case where the second function related to reading process of a single page is set, performing a detection process in which the detection process is executed on the read single page.

11. The image reading method according to claim 10, further comprising
warning a user in a case where the forgetting of the document is detected.

12. The image reading method according to claim 10, further comprising,
determining whether the detection process is necessary, every time after a reading process for reading an image for a single page is performed,
wherein in a case where a reading process for reading a last page among pages to be consecutively read is performed, it is determined that the detection process is necessary, and in a case where a reading process for reading a page other than the last page is performed, it is determined that the detection process is not necessary.

13. The image reading method according to claim 12, wherein in a case where the reading process is canceled, or a case where an error occurs it is determined that the detection process is necessary even in a case where a page to be read is not the last page of the document.

14. The image reading method according to claim 12, wherein in a case where a reading process different from an actual reading process for acquiring desired image data is performed, it is determined that the detection process is not necessary.

15. The image reading method according to claim 10, further comprising,
displaying, in a case where the function of reading a document including a plurality of pages is set, a screen allowing a selection of whether the execution of the reading process is to continue every time after a reading process for reading an image for a single page is executed,
wherein in a case where a selection in which the execution of the reading process is to continue is not made in the screen, the detection process is controlled to be executed.

16. The image reading method according to claim 10, wherein in the detection process, the forgetting of the document is detected by detecting whether a cover for covering the document set on the document platen is opened and closed.

17. The image reading method according to claim 10,
wherein an output value of a reading sensor is acquired to perform a reading process for reading the document, the reading sensor moving relative to the document and
wherein in the detection process, the output value of the reading sensor placed at a predetermined position is periodically acquired to detect the forgetting of the document.

18. The image reading method according to claim 10, wherein the first function is at least one of N-in-1 copying and two-sided copying, where N is an integer greater than 1.

* * * * *